US012603059B2

(12) United States Patent
Lee et al.

(10) Patent No.: US 12,603,059 B2
(45) Date of Patent: Apr. 14, 2026

(54) DISPLAY DEVICE

(71) Applicant: SAMSUNG DISPLAY CO., LTD., Yongin-si (KR)

(72) Inventors: Jaehoon Lee, Seoul (KR); Dae-Seop Kim, Suwon-si (KR); Cheolmin Kim, Seongnam-si (KR); Byung Ki Chun, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 507 days.

(21) Appl. No.: 18/045,570

(22) Filed: Oct. 11, 2022

(65) Prior Publication Data

US 2023/0135235 A1 May 4, 2023

(30) Foreign Application Priority Data

Nov. 2, 2021 (KR) ........................ 10-2021-0149122

(51) Int. Cl.

*G09G 3/3275* (2016.01)
*G09G 3/3233* (2016.01)
*G09G 3/20* (2006.01)

(52) U.S. Cl.

CPC ......... *G09G 3/3275* (2013.01); *G09G 3/3233* (2013.01); *G09G 3/2003* (2013.01);
(Continued)

(58) Field of Classification Search

CPC .. G09G 3/3275; G09G 3/2003; G09G 3/3233; G09G 2300/0413;
(Continued)

(56) References Cited

U.S. PATENT DOCUMENTS 7,710,366 B2 5/2010 Lee et al.
8,878,753 B2 11/2014 Yamashita et al.
(Continued)

FOREIGN PATENT DOCUMENTS

JP 2004-145257 A2 5/2004
JP 2012-128149 A2 7/2012
(Continued)

*Primary Examiner* — William Boddie
*Assistant Examiner* — Saifeldin E Elnafia
(74) *Attorney, Agent, or Firm* — F. CHAU & ASSOCIATES, LLC

(57) ABSTRACT

A display device may compensate for such changes in characteristics of light emitting elements and transistors in pixels of a display. For example, a driving circuit of a display device may update a lookup table that stores one or more compensation values. Each compensation value may correspond to a characteristic change of a pixel. In some embodiments, the characteristic change of a transistor may be determined based on a sensing signal received from a dummy pixel. Accordingly, a display device may generate a compensation signal based on an actual characteristic change of the transistor in the pixel. The compensation signal may be used by the display device to compensate for pixel characteristic changes that occur over time. For instance, a display device may use such compensation signals to correct input signals (e.g., to generate a corrected output signal) to be applied to one or more pixels of a display.

18 Claims, 12 Drawing Sheets

(52) U.S. Cl.
CPC ............... *G09G 2300/0413* (2013.01); *G09G 2300/0819* (2013.01); *G09G 2320/0233* (2013.01); *G09G 2320/0271* (2013.01); *G09G 2320/029* (2013.01); *G09G 2320/0295* (2013.01); *G09G 2320/043* (2013.01); *G09G 2320/045* (2013.01); *G09G 2340/00* (2013.01)

(58) Field of Classification Search
CPC ... G09G 2300/0819; G09G 2320/0233; G09G 2320/0271; G09G 2320/029; G09G 2320/0295; G09G 2320/043; G09G 2320/045; G09G 2340/00
See application file for complete search history.

(56) References Cited

U.S. PATENT DOCUMENTS

2004/0239596 A1* 12/2004 Ono .................... G09G 3/3233 345/76
2009/0225105 A1* 9/2009 Park .................... G09G 3/3688 345/690
2010/0020051 A1* 1/2010 Kim .................... G09G 3/3233 345/207
2016/0027378 A1* 1/2016 Kim .................... G02B 6/0055 345/207
2016/0027382 A1* 1/2016 Chaji .................... G09G 3/006 345/212
2017/0148385 A1* 5/2017 Kishi .................. G09G 3/3283
2017/0162226 A1* 6/2017 Yamanaka .............. G09G 5/00
2019/0213949 A1* 7/2019 Han .................... G09G 3/3208
2021/0201825 A1 7/2021 Yun et al.

FOREIGN PATENT DOCUMENTS

KR 10-1142994 5/2012
KR 10-2012-0078443 A 7/2012
KR 10-2017-0003217 A 1/2017
KR 10-2017-0023618 3/2017
KR 10-2017-0077965 A 7/2017
KR 10-2020-0071433 6/2020
KR 10-2021-0071587 A 6/2021
KR 10-2021-0085301 7/2021

* cited by examiner

FIG. 12

112

| | | First Accumulation Signal | | | | | | | | | | | | | | | | |
|---|---|---|---|---|---|---|---|---|---|---|---|---|---|---|---|---|---|---|
| Input Image Signal | | 0 | 16 | 32 | 64 | 128 | 192 | 256 | 320 | 384 | 448 | 512 | 576 | 640 | 704 | 768 | 896 | 1024 |
| | 0 | 0 | 0 | 0 | 0 | 0 | 0 | 0 | 0 | 0 | 0 | 0 | 0 | 0 | 0 | 0 | 0 | 0 |
| | 128 | 128 | 144 | 147 | 170 | 184 | 197 | 219 | 234 | 242 | 255 | 261 | 263 | 264 | 266 | 288 | 304 | 342 |
| | 256 | 256 | 288 | 295 | 339 | 369 | 394 | 438 | 467 | 485 | 510 | 521 | 527 | 528 | 531 | 576 | 607 | 645 |
| | 384 | 384 | 432 | 442 | 509 | 553 | 591 | 657 | 701 | 727 | 765 | 782 | 790 | 792 | 797 | 865 | 901 | 927 |
| | 512 | 512 | 576 | 590 | 678 | 738 | 788 | 876 | 935 | 969 | 1019 | 1042 | 1053 | 1057 | 1062 | 1153 | 1183 | 1203 |
| | 640 | 640 | 719 | 737 | 848 | 922 | 985 | 1095 | 1168 | 1211 | 1274 | 1303 | 1317 | 1321 | 1328 | 1441 | 1468 | 1511 |
| | 768 | 768 | 863 | 885 | 1017 | 1107 | 1182 | 1314 | 1402 | 1454 | 1529 | 1563 | 1580 | 1585 | 1594 | 1729 | 1802 | 1854 |
| | 896 | 896 | 1007 | 1032 | 1187 | 1291 | 1379 | 1533 | 1636 | 1696 | 1784 | 1824 | 1843 | 1849 | 1859 | 2017 | 2036 | 2096 |
| | | ••• | ••• | ••• | ••• | ••• | ••• | ••• | ••• | ••• | ••• | ••• | ••• | ••• | ••• | ••• | ••• | ••• |
| | 8064 | 8064 | 8192 | 8192 | 8192 | 8192 | 8192 | 8192 | 8192 | 8192 | 8192 | 8192 | 8192 | 8192 | 8192 | 8192 | 8192 | 8192 |

DISPLAY DEVICE

CROSS-REFERENCE TO RELATED APPLICATIONS

This application claims priority under 35 U.S.C. § 119 to Korean Patent Application No. 10-2021-0149122 filed on Nov. 2, 2021, in the Korean Intellectual Property Office, the disclosure of which is incorporated by reference herein in its entirety.

BACKGROUND

Certain embodiments of the present disclosure described herein relate to a display device.

Electronic devices (e.g., such as smart phones, digital cameras, notebook computers, navigation systems, monitors, smart televisions, etc.) may include a display device for providing (e.g., displaying) images or video to a user. For example, a display device may generate an image and then provide the user with the generated image through a display screen.

The display device may include a plurality of pixels, as well as driving circuits for controlling the plurality of pixels. Each of the plurality of pixels may include a light emitting element and a pixel circuit for controlling the light emitting element. The driving circuit of a pixel may include a plurality of transistors organically connected to one another. For instance, the display device may apply a data signal to a display panel to display a predetermined image (e.g., where a current corresponding to the data signal is provided to the light emitting elements of the pixels of the display).

However, in some cases, light emitting elements and transistors constituting pixels of a display device may deteriorate. For instance, after extended operation of pixel light emitting elements and transistors, the characteristics of the pixel may be changed (e.g., which may adversely affect the intended appearance of the pixel to an observer). There is a need in the art for improved display devices and improved methods for operating display devices.

SUMMARY

Embodiments of the present disclosure provide a display device capable of compensating for a change in characteristics of a pixel.

According to an embodiment, a display device includes a display panel including a pixel positioned in an active area and a dummy pixel positioned in an inactive area adjacent to the active area, a driving controller outputting an output image signal (e.g., for compensating for an input image signal) to a data driving circuit based on a sensing signal received from the dummy pixel, and the data driving circuit providing the pixel with a data signal corresponding to the output image signal. The driving controller includes a first accumulator accumulating the output image signal and outputting a first accumulation signal, a first lookup table storing a compensation value, the grayscale value corresponding to a grayscale level of the input image signal and an operating time of the pixel, a sensing compensator correcting the compensation value stored in the first lookup table based on the sensing signal received from the dummy pixel, a first compensator outputting a first compensation signal based on the input image signal, the first accumulation signal, and the compensation value stored in the first lookup table, and an adder outputting the output image signal by adding the first compensation signal to the input image signal.

In an embodiment, the sensing compensator may include a compensation grayscale calculator calculating a compensation grayscale corresponding to the sensing signal, a sensing accumulator accumulating the sensing signal and outputting operating time information corresponding to an operating time of the dummy pixel, a reference value storage outputting a compensation reference value corresponding to the operating time information, and a compensation value calculator calculating a difference value between the compensation grayscale and the compensation reference value and outputting a correction value for correcting the compensation value stored in the first lookup table, wherein the correction value corresponds to the calculated difference value.

In an embodiment, the pixel may include a first transistor electrically connected between a first voltage line and a first node, where the first transistor includes a gate electrode receiving the data signal from the data driving circuit. The pixel may also include a light emitting element electrically connected between the first node and a second voltage line.

In an embodiment, the first compensation signal is a signal for compensating for a current at the first node according to a characteristic change of the first transistor.

In an embodiment, the driving controller may further include a second accumulator accumulating the output image signal and outputting a second accumulation signal and a second compensator outputting a second compensation signal corresponding to the input image signal and the second accumulation signal. The adder may output the output image signal by adding the first compensation signal and the second compensation signal to the input image signal.

In an embodiment, the second compensation signal is a signal for compensating for a characteristic change of the light emitting element.

In an embodiment, the first compensator may receive the second accumulation signal from the second compensator, calculate a voltage correction coefficient based on (e.g., according to) the second accumulation signal, change a grayscale level of the input image signal into a grayscale level corresponding to the voltage correction coefficient, and output the first compensation signal corresponding to the changed grayscale level and the first accumulation signal based on (e.g., with reference to) the compensation value from the first lookup table.

In an embodiment, the voltage correction coefficient is proportional to the operating time of the pixel.

In an embodiment, the dummy pixel may include a first transistor electrically connected between a first voltage line and a first node, and the first transistor may include a gate electrode configured to receive the data signal. The dummy pixel may also include a light emitting element electrically connected between the first node and a second voltage line.

In an embodiment, the sensing signal may correspond to a current at the first node.

In an embodiment, the driving controller may further include a second lookup table storing a correction value according to a location of the pixel in the display panel. The first accumulator may output the first accumulation signal corresponding to the output image signal based on referencing the correction value stored in the second lookup table.

According to an embodiment, a display device includes a display panel including a pixel positioned in an active area and a dummy pixel positioned in an inactive area adjacent to the active area, a driving controller outputting an output image signal (e.g., for compensating for an input image signal) based on a sensing signal received from the dummy pixel, and a data driving circuit providing the pixel with a data signal corresponding to the output image signal. The pixel includes a light emitting element and a transistor electrically connected to the light emitting element. The driving controller includes a first compensation block outputting: a first compensation signal for compensating for a characteristic change of the transistor based on the input image signal, a first accumulation signal from accumulating the output image signal, and the sensing signal. The driving controller further includes a second compensation block outputting: a second compensation signal for compensating for a characteristic change of the light emitting element based on the input image signal and a second accumulation signal from accumulating the output image signal. The driving controller further includes an adder outputting the output image signal by adding the input image signal, the first compensation signal, and the second compensation signal.

In an embodiment, the first compensation block may include a first accumulator accumulating the output image signal and outputting the first accumulation signal; a first lookup table storing a compensation value, the compensation value corresponding to a grayscale level of the input image signal and an operating time of the pixel; a sensing compensator correcting the compensation value stored in the first lookup table based on the sensing signal from the dummy pixel; and a first compensator outputting the first compensation signal, the first compensation signal corresponding to the input image signal and the first accumulation signal based on the compensation value stored in the first lookup table.

In an embodiment, the sensing compensator may include a compensation grayscale calculator calculating a compensation grayscale corresponding to the sensing signal, a sensing accumulator accumulating the sensing signal and outputting operating time information corresponding to an operating time of the dummy pixel, a reference value storage outputting a compensation reference value corresponding to the operating time information, and a compensation value calculator. The compensation value calculator may calculate a difference value between the compensation grayscale and the compensation reference value, and output a correction value for correcting the compensation value stored in the first lookup table, where the correction value corresponds to the difference value.

In an embodiment, the second compensation block may include a second accumulator accumulating the output image signal and to output the second accumulation signal and a second compensator outputting the second compensation signal corresponding to the input image signal and the second accumulation signal.

In an embodiment, the first compensator may receive the second accumulation signal from the second compensator, may calculate a voltage correction coefficient according to the second accumulation signal, may change a grayscale level of the input image signal into a grayscale level corresponding to the voltage correction coefficient, and may output the first compensation signal corresponding to the changed grayscale level and the first accumulation signal based on referencing the compensation value from the first lookup table.

In an embodiment, the voltage correction coefficient is proportional to the operating time of the pixel.

In an embodiment, the dummy pixel may include a first transistor electrically connected between a first voltage line and a first node, where the first transistor includes a gate electrode configured to receive the data signal. The dummy pixel may further include a light emitting element electrically connected between the first node and a second voltage line.

In an embodiment, the sensing signal may correspond to a current at the first node.

In an embodiment, the driving controller may further include a second lookup table storing a correction value according to a location of the pixel in the display panel. The first accumulator may output the first accumulation signal corresponding to the output image signal based on referencing the correction value stored in the second lookup table.

BRIEF DESCRIPTION OF THE FIGURES

The above and other features of the present disclosure will become apparent by describing in detail embodiments thereof with reference to the accompanying drawings.

FIG. 12 shows a first lookup table.

DETAILED DESCRIPTION OF THE EMBODIMENTS

Figure 1:
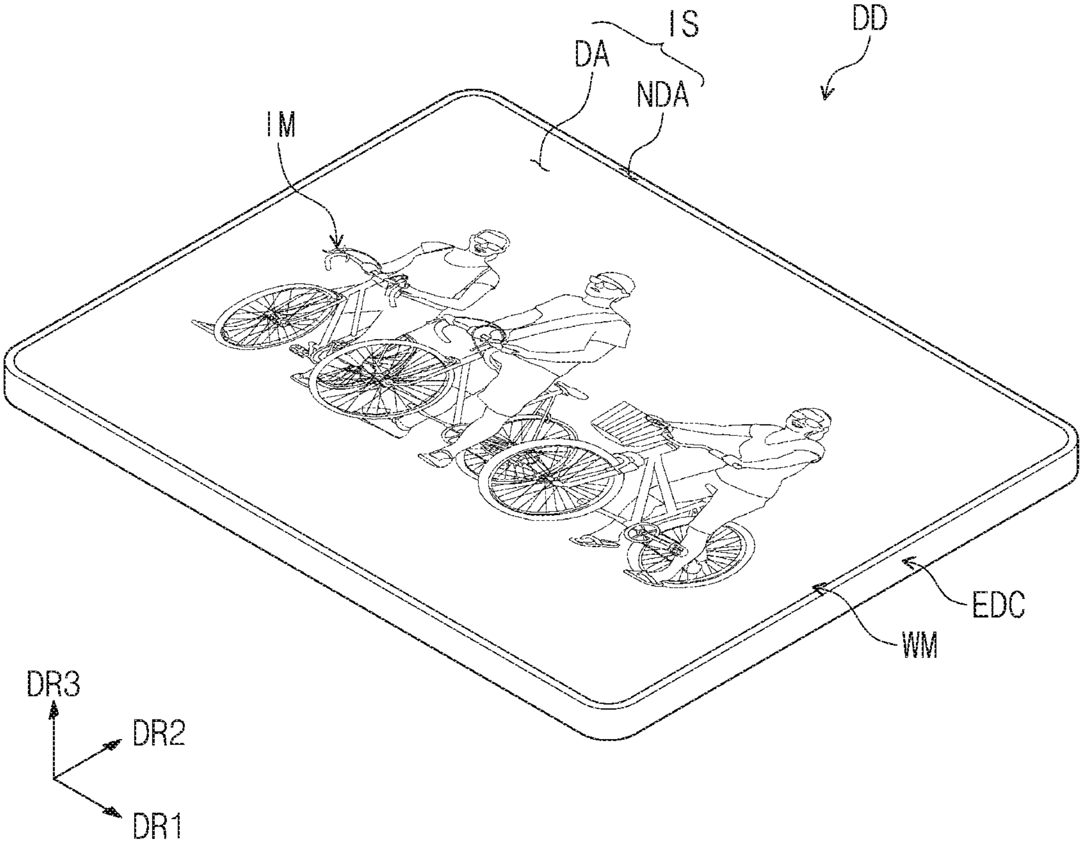
FIG. 1 is a perspective view of a display device, according to one or more aspects of the present disclosure.

Electronic devices (e.g., such as smart phones, digital cameras, notebook computers, navigation systems, monitors, smart televisions, etc.) may include a display device for providing (e.g., displaying) images or video to a user. In some cases (e.g., due to extended operation of light emitting elements and transistors of pixels of a display device, etc.), characteristics of display pixel may change, which may adversely affect the intended appearance of the pixel to an observer.

According to the techniques described herein, a display device may compensate for such changes in characteristics of light emitting elements and transistors in pixels of a display. For example, a driving circuit of a display device may update a lookup table that stores one or more compensation values. Each compensation value may correspond to a characteristic change of a transistor. In some embodiments, the characteristic change of a transistor may be determined (e.g., and stored) based on a sensing signal received from a dummy pixel. Accordingly, a display device may generate a compensation signal based on an actual characteristic change of the transistor in the pixel. The compensation signal may be used by the display device to compensate for pixel characteristic changes that occur over time. For instance, a display device may use such compensation signals to correct input signals to be applied to one or more pixels of a display (e.g., such that the output signal, or compensated input signal, applied to a given pixel of the display accounts for characteristic changes associated with the given pixel of the display). Accordingly, based on one or more aspects of the present disclosure, a display device may drive pixels with improved intended accuracy, a display device may produce images that appear more natural to a user/observer, etc.

In some cases, in the present specification, the expression that a first component (or region, layer, part, etc.) is "on", "connected with", or "coupled with" a second component may mean that the first component is directly on, connected with, or coupled with the second component or means that a third component is interposed therebetween.

Like reference numerals may refer to like components. Also, in drawings, the thickness, ratio, and dimension of components may be exaggerated for effectiveness of description of technical contents. The term "and/or" may include one or more combinations of the associated listed items.

The terms "first", "second", etc. may be used to describe various components, but the components are not limited by the terms. The terms may be used only to differentiate one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "beneath", "on", "above", etc. may be used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification may have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

Figure 2:
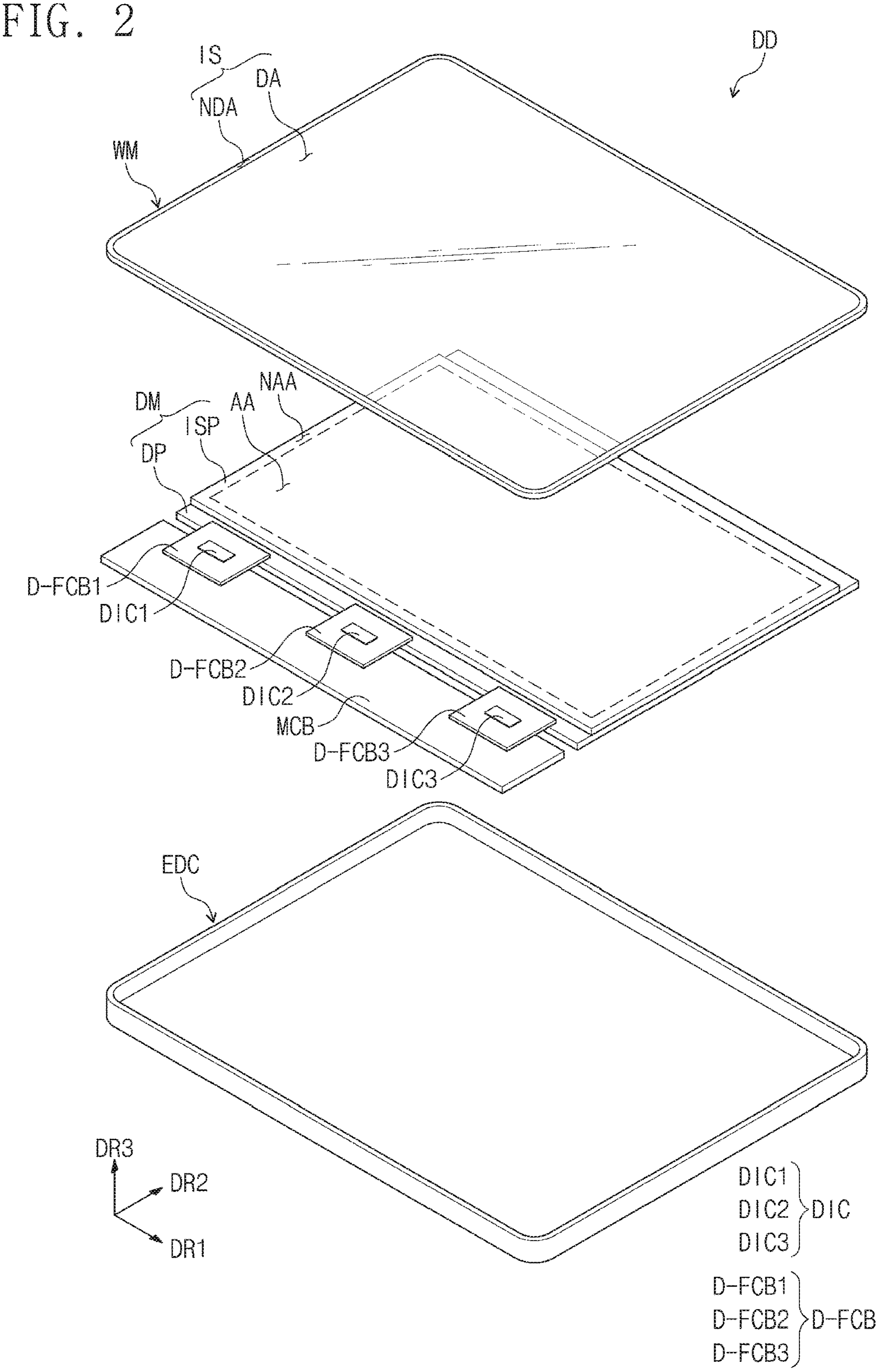
FIG. 2 is an exploded perspective view of a display device, according to one or more aspects of the present disclosure.

FIG. 1 is a perspective view of a display device, according to one or more aspects of the present disclosure. FIG. 2 is an exploded perspective view of a display device, according to one or more aspects of the present disclosure.

Referring to FIGS. 1 and 2, a display device DD may be a device activated depending on an electrical signal. The display device DD according to the present disclosure may be a small and medium-sized electronic device, such as a mobile phone, a tablet PC, a notebook computer, a vehicle navigation system, or a game console, as well as a large-sized electronic device, such as a television or a monitor. The above descriptions are provided for exemplary purposes, and it is obvious that the display device DD may be applied to any other display device(s) without departing from the concept of the present disclosure. The display device DD has a rectangular shape having a long side in a first direction DR1 and a short side in a second direction DR2 crossing in the first direction DR1. However, the shape of the display device DD is not limited thereto. For example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In some aspects, a display may comprise a conventional monitor, a monitor coupled with an integrated display, an integrated display (e.g., an LCD display), or other means for viewing associated data or processing information.

In some examples, a front surface (or an upper/top surface) and a rear surface (or a lower/bottom surface) of each member are defined based on a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Meanwhile, directions that the first, second, and third directions DR1, DR2, and DR3 indicate may be relative in concept and may be changed to different directions.

The display device DD may sense an external input applied from the outside. The external input may include various types of inputs that are provided from the outside of the display device DD. The display device DD according to some examples of the present disclosure may sense an external input of a user, which is applied from the outside. The external input of the user may one of various types of external inputs, such as a part of his/her body, light, heat, his/her eye, and pressure, or a combination thereof. Also, the display device DD may sense the external input of the user applied to a side surface or a rear surface of the display device DD depending on a structure of the display device DD and is not limited to one embodiment. As an example of the present disclosure, an external input may include an input by an input device (e.g., a stylus pen, an active pen, a touch pen, an electronic pen, or an E-pen).

In some embodiments, the display surface IS of the display device DD is divided into a display area DA and a non-display area NDA. The display area DA may be an area in which the image IM is displayed. The user perceives (or views) the image IM through the display area DA. In some examples, the display area DA is illustrated in the shape of a quadrangle whose vertexes are rounded. However, this is illustrated as an example. The display area DA may have various shapes by analogy, without departing from the scope of the present disclosure.

A non-display area NDA is adjacent to the display area DA. The non-display area NDA may have a given color. The non-display area NDA may surround the display area DA. As such, a shape of the display area DA may be defined substantially by the non-display area NDA. However, this is illustrated as an example. The non-display area NDA may be disposed adjacent to only one side of the display area DA or may be omitted. In some cases, one or more aspects of display device DD may be modified and techniques described herein may still be applied, without departing from the scope of the present disclosure.

As illustrated in FIG. 2, the display device DD may include a display module DM and a window WM disposed on the display module DM. The display module DM may include a display panel DP and an input sensing layer ISP.

According to some examples of the present disclosure, the display panel DP may include a light emitting display panel. For example, the display panel DP may be an organic light emitting display panel, an inorganic light emitting display panel, a quantum dot light emitting display panel. An emission layer of the organic light emitting display layer may include an organic light emitting material. An emission layer of the inorganic light emitting display panel may include an inorganic light emitting material. An emission layer of the quantum dot light emitting display panel may include a quantum dot and a quantum rod. Hereinafter, the description may assume that the display panel DP is an organic light-emitting display panel (e.g., however techniques and devices described herein are not limited thereto).

In some embodiments, the display panel DP outputs the image IM, and the output image IM is displayed through the display surface IS.

In some embodiments, the input sensing layer ISP is disposed on the display panel DP to sense an external input. The input sensing layer ISP may be directly disposed on the display panel DP. According to some examples of the present disclosure, the input sensing layer ISP may be formed on the display panel DP by a subsequent process. For example, in the case where the input sensing layer ISP is directly disposed on the display panel DP, an inner adhesive film (not illustrated) is not interposed between the input sensing layer ISP and the display panel DP. However, an inner adhesive film may be interposed between the input sensing layer ISP and the display panel DP. In this case, the input sensing layer ISP is not manufactured together with the display panel DP through the subsequent processes. For example, the input sensing layer ISP may be manufactured through a process separate from that of the display panel DP and may then be fixed on an upper surface of the display panel DP by the inner adhesive film.

In some embodiments, the window WM is formed of a transparent material capable of outputting the image IM. For example, the window WM may be formed of glass, sapphire, plastic, etc. It is illustrated that the window WM is implemented with a single layer. However, aspects of the present disclosure are not limited thereto. For example, the window WM may include a plurality of layers.

In some embodiments, the non-display area NDA of the display device DD described above corresponds to an area that is defined by printing a material including a given color on one area of the window WM. As an example of the present disclosure, the window WM may include a light blocking pattern for defining the non-display area NDA. The light blocking pattern, which has the form of an organic film having a color, may be, for example, formed in a coating manner.

In some embodiments, the window WM is coupled to the display module DM through an adhesive film. As an example of the present disclosure, the adhesive film may include an optically clear adhesive (OCA) film. However, the adhesive film is not limited thereto. For example, the adhesive film may include a typical adhesive or sticking agent. For example, the adhesive film may include an optically clear resin (OCR) or a pressure sensitive adhesive (PSA) film.

In some embodiments, an anti-reflection layer is further disposed between the window WM and the display module DM. The anti-reflection layer decreases reflectivity of an external light incident from above the window WM. The anti-reflection layer, according to some examples of the present disclosure, may include a retarder and a polarizer. The retarder may be a retarder of a film type or a liquid crystal coating type and may include a $\lambda/2$ retarder and/or a $\lambda/4$ retarder. The polarizer may also have a film type or a liquid crystal coating type. The film type may include a stretch-type synthetic resin film, and the liquid crystal coating type may include liquid crystals arranged in a given direction. The retarder and the polarizer may be implemented with one polarization film.

As an example of the present disclosure, the anti-reflection layer may also include color filters. The arrangement of the color filters may be determined based on colors of light generated from a plurality of pixels PX (e.g., as described in more detail herein, for example, with reference to FIG. 3) included in the display panel DP. Also, the anti-reflection layer may further include a light blocking pattern.

The display module DM may display the image IM depending on an electrical signal and may transmit/receive information about an external input. The display module DM may be defined by an active area AA and an inactive area NAA. The active area AA may be defined as an area through which the image IM provided from the display area DA is output. Also, the active area AA may be defined as an area in which the input sensing layer ISP senses an external input applied from the outside.

The inactive area NAA is adjacent to the active area AA. For example, the inactive area NAA may surround the active area AA. However, this is illustrated by way of an example. The inactive area NAA may be defined in various shapes, and is not limited to any single embodiment. According to some examples, the active area AA of the display module DM may correspond to at least part of the display area DA.

The display module DM may further include a main circuit board MCB, flexible circuit films D-FCB, and driver chips DIC. The main circuit board MCB may be connected to the flexible circuit films D-FCB and may be electrically connected to a display panel DP. The flexible circuit films D-FCB is connected to the display panel DP to electrically connect the display panel DP to the main circuit board MCB. The main circuit board MCB may include a plurality of driving elements. The plurality of driving elements may include a circuit unit for driving the display panel DP. The driver chips DIC may be mounted on the flexible circuit films D-FCB.

As an example of the present disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be disposed spaced from each other in the first direction DR1 and may be connected with the display panel DP to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, embodiments of the present disclosure are not limited thereto. For example, the display panel DP may be electrically connected with the main circuit board MCB through one flexible circuit film, and only one driver chip may be mounted on the one flexible circuit film. Also, the display panel DP may be electrically connected with the main circuit board MCB through four or more flexible circuit films, and driver chips may be respectively mounted on the flexible circuit films.

A structure in which the first to third driver chips DIC1, DIC2, and DIC3 are respectively mounted on the first to third flexible circuit films D-FCB1, D-FCB2, and D-FCB3 is illustrated in FIG. 2, but the present disclosure is not limited thereto. For example, the first to third driver chips DIC1, DIC2, and DIC3 may be directly mounted on the display panel DP. In this case, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. Also, the first to third driver chips DIC1, DIC2, and DIC3 may be directly mounted on the main circuit board MCB.

In some embodiments, the input sensing layer ISP is electrically connected with the main circuit board MCB through the flexible circuit films D-FCB. However, embodiments of the present disclosure is not limited thereto. For example, the display module DM may additionally include a separate flexible circuit film for electrically connecting the input sensing layer ISP and the main circuit board MCB.

The display device DD further includes an outer case EDC accommodating the display module DM. The outer case EDC may be coupled with the window WM to define the exterior of the display device DD. The outer case EDC may absorb external shocks and may prevent a foreign material/moisture or the like from being infiltrated into the display module DM such that components accommodated in the outer case EDC are protected. Meanwhile, as an example of the present disclosure, the outer case EDC may be provided in the form of a combination of a plurality of accommodating members.

The display device DD according to some examples may further include an electronic module including various functional modules for operating the display module DM, a power supply module (e.g., a battery) for supplying a power necessary for overall operations of the display device DD, a bracket coupled with the display module DM and/or the outer case EDC to partition an inner space of the display device DD, etc.

Figure 3:
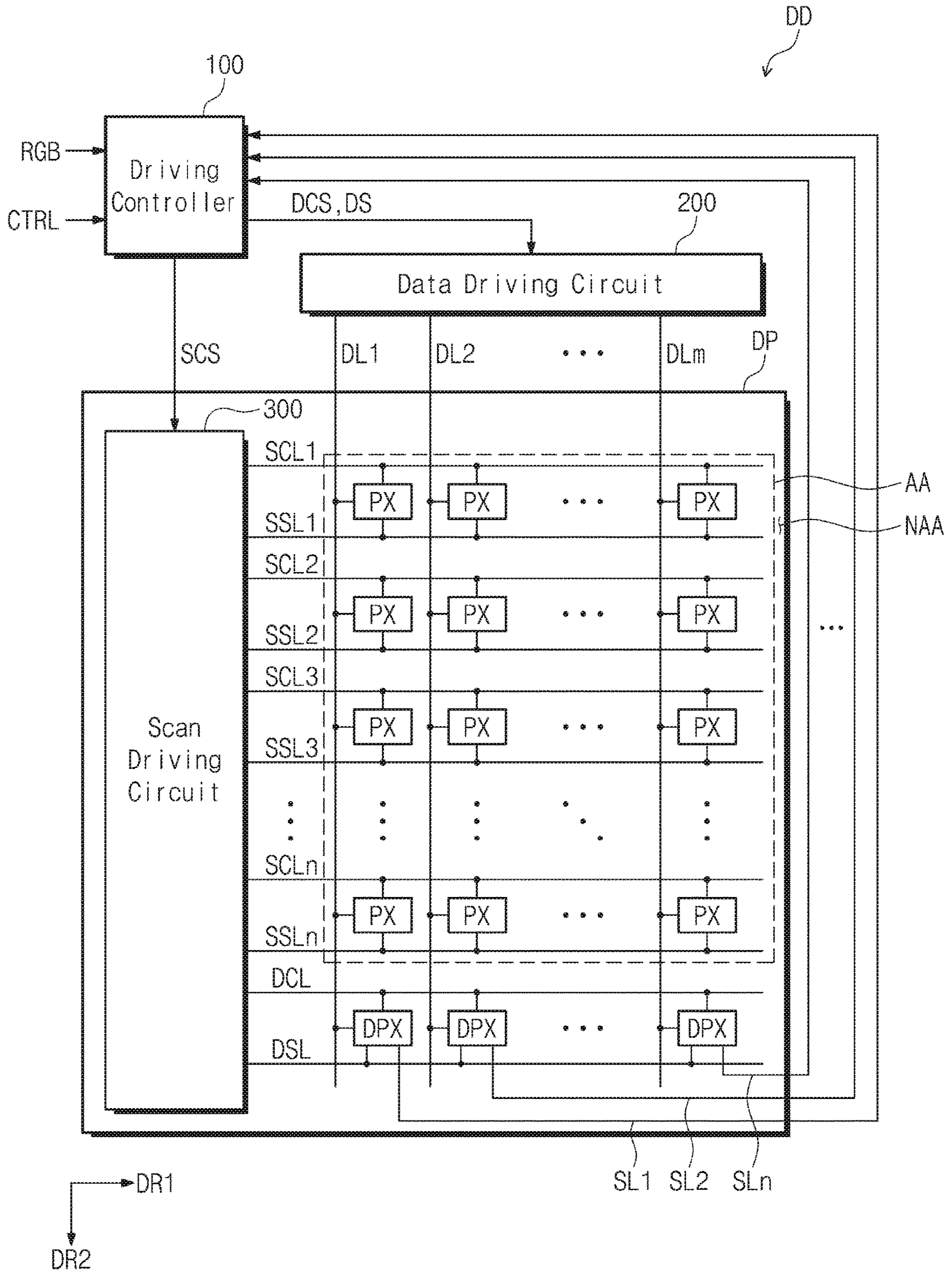
FIG. 3 is a block diagram of a display device, according to one or more aspects of the present disclosure.

FIG. 3 is a schematic diagram of a display device, according to one or more aspects of the present disclosure.

Referring to FIG. 3, the display device DD includes a driving controller 100, a data driving circuit 200, and the display panel DP.

The driving controller 100 receives an input image signal RGB and a control signal CTRL. The driving controller 100 generates an output image signal DS by converting a data format of the input image signal RGB to be suitable for (e.g., to be compatible with) the interface specification of the data driving circuit 200. The driving controller 100 may output a scan control signal SCS and a data control signal DCS.

The data driving circuit 200 receives the data control signal DCS and the output image signal DS from the driving controller 100. The data driving circuit 200 converts the output image signal DS into data signals and then outputs the data signals to a plurality of data lines DL1 to DLm to be described later. The data signals may refer to analog voltages corresponding to a grayscale level of the output image signal DS (e.g., based on aspects of the output image signal DS that apply to respective data lines DL1 to DLm). The data driving circuit 200 may be disposed in the driver chips DIC shown in FIG. 2.

The display panel DP includes first scan lines SCL1 to SCLn, second scan lines SSL1 to SSLn, dummy scan lines DCL and DSL, the data lines DL1 to DLm, pixels PX, and dummy pixels DPX. The display panel DP may further include a scan driving circuit 300. In some examples, the scan driving circuit 300 may be arranged on a first side of the display panel DP. The first scan lines SCL1 to SCLn and the second scan lines SSL1 to SSLn extend in the first direction DR1 from the scan driving circuit 300.

In some embodiments, the driving controller 100, the data driving circuit 200, and the scan driving circuit 300 comprise a driving circuit for providing a data signal to the pixels PX of the display panel DP.

In some embodiments, the display panel DP is divided into the active area AA and the inactive area NAA. The pixels PX may be positioned in the active area AA. The dummy pixels DPX and the scan driving circuit 300 may be positioned in the inactive area NAA.

The first scan lines SCL1 to SCLn and the second scan lines SSL1 to SSLn extend from the scan driving circuit 300 in the first direction DR1 and are positioned spaced from each other in the second direction DR2. The data lines DL1 to DLm extend from the data driving circuit 200 in the second direction DR2 and are arranged to be spaced from each other in the first direction DR1.

The plurality of pixels PX are electrically connected to the first scan lines SCL1 to SCLn, the second scan lines SSL1 to SSLn, and the data lines DL1 to DLm. For example, the first row of pixels may be connected to the first scan lines SCL1 and the second scan line SSL1. Moreover, the second row of pixels may be connected to the first scan lines SCL2 and the second scan line SSL2.

Figure 4:
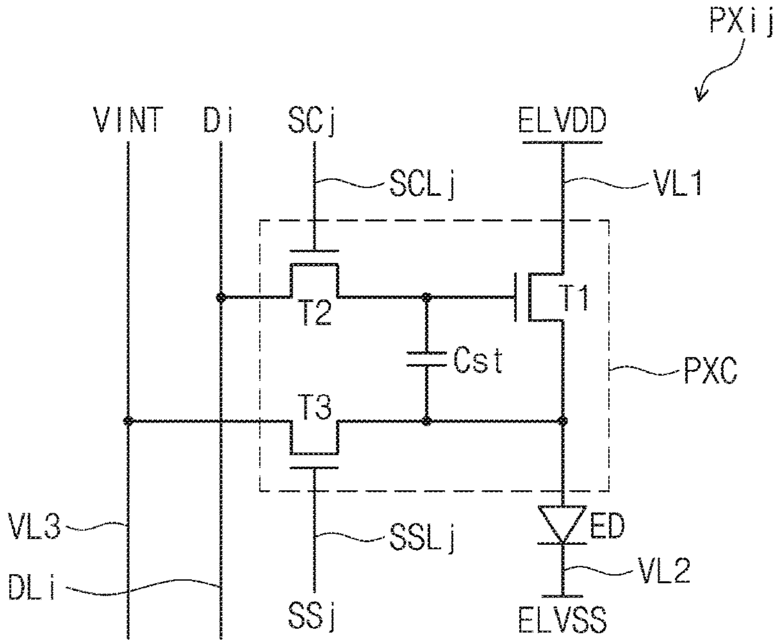
FIG. 4 is a circuit diagram of a pixel, according to one or more aspects of the present disclosure.

Each of the plurality of pixels PX includes a light emitting element ED and a pixel circuit unit PXC (e.g., as described in more detail herein, for example, with reference to FIG. 4) for controlling the light emission of the light emitting element ED. The pixel circuit unit PXC may include a plurality of transistors and a capacitor. The scan driving circuit 300 may include transistors formed through the same process as the pixel circuit unit PXC. In some examples, the light emitting element ED may be an organic light emitting diode. However, the present disclosure is not limited thereto.

Each of the plurality of dummy pixels DPX may include the same circuit configuration as the pixels PX. The plurality of dummy pixels DPX are electrically connected to the dummy scan lines DCL and DSL and the data lines DL1 to DLm.

Although not shown in the drawing, the plurality of pixels PX may receive a plurality of driving voltages, respectively.

The plurality of dummy pixels DPX may receive a plurality of driving voltages, respectively.

The scan driving circuit 300 receives the scan control signal SCS from the driving controller 100. In response to the scan control signal SCS, the scan driving circuit 300 may output first scan signals to the first scan lines SCL1 to SCLn and may output second scan signals to the second scan lines SSL1 to SSLn.

In some examples, the scan driving circuit 300 is disposed on the first side of the display area DA, but the present disclosure is not limited thereto. In some examples, the scan driving circuit 300 may be disposed on the first side and the second side of the display area DA. For example, the scan driving circuit disposed on the first side of the display area DA may provide the first scan signals to the first scan lines SCL1 to SCLn. The scan driving circuit disposed on the second side of the display area DA may provide the second scan signals to the second scan lines SSL1 to SSLn.

Characteristics of a pixel may change for various reasons, for example, such as extended use, location of a pixel, etc. For example, different pixels may have different stress levels (e.g., or different degrees of deterioration) depending on pixel locations in a display panel, frequency of pixel usage, etc.

As used herein, compensating for a characteristic change may generally refer to various techniques for reducing (e.g., or reversing) effects (e.g., display effects, pixel driving effects, etc.) arising from a characteristic change. For example, compensating for a characteristic change of a pixel may refer to adjusting an input image signal RGB to be applied to the pixel to account for the characteristic change of a pixel. For instance, a characteristic change of a pixel (e.g., based on extended use of the pixel, etc.) may be compensated for by modifying various signals according to the techniques described herein. As one example, compensating for a characteristic change of a pixel may include converting a grayscale level of a driving image signal for a pixel depending on a location of the pixel.

Generally, a characteristic change of a pixel may refer to any change to any characteristic of a pixel, any change to any characteristic of a transistor of a pixel, any change to any characteristic of a light emitting element of a pixel, etc. For example, characteristic changes may include chemical characteristic changes of any element of a pixel, conductivity characteristic changes of any element of a pixel, insulation characteristic changes of any element of a pixel, resistivity characteristic changes of any element of a pixel, etc. Characteristic changes of a pixel may include characteristic changes of pixel transistors, characteristic changes of transistor gate electrodes, characteristic changes of transistor terminals (e.g., transistor body terminals, transistor source terminals, transistor drain terminals, etc.), characteristic changes of pixel light emitting elements, etc. In some cases, characteristic change of a pixel may include characteristic changes of, or based on, nodes or voltage lines associated with a pixel.

In some examples, the driving controller 100 may convert the input image signal RGB to the output image signal DS in response to a sensing signal SS provided from the dummy pixels DPX of the display panel DP.

FIG. 3 shows that the dummy pixels DPX are positioned at a lower side of the display panel DP, but the present disclosure is not limited thereto. The dummy pixels DPX may be arranged in various shapes within the inactive area NAA of the display panel DP.

FIG. 4 is a circuit diagram of a pixel, according to one or more aspects of the present disclosure.

FIG. 4 illustrates an equivalent circuit diagram of a pixel PXij connected to an i-th data line DLi among the data lines DL1 to DLm, a j-th first scan line SCLj among the first scan lines SCL1 to SCLn, and a j-th second scan line SSLj among the second scan lines SSL1 to SSLn, which are illustrated in FIG. 1.

Each of the plurality of pixels PX shown in FIG. 3 may have the same circuit configuration as the pixel PXij shown in FIG. 4. In some examples, the pixel PXij includes the at least one light emitting element ED and the pixel circuit unit PXC.

The pixel circuit unit PXC may include at least one transistor, which is electrically connected to the light emitting element ED and which is used to provide a current corresponding to the data signal Di delivered from the data line DLi to the light emitting element ED. In some examples, the pixel circuit unit PXC of the pixel PXij includes a first transistor T1, a second transistor T2, a third transistor T3, and a capacitor Cst. Each of the first to third transistors T1 to T3 is an N-type transistor by using an oxide semiconductor as a semiconductor layer. However, the present disclosure is not limited thereto. For example, each of the first to third transistors T1 to T3 may be a P-type transistor having a low-temperature polycrystalline silicon (LTPS) semiconductor layer. In some examples, at least one of the first to third transistors T1 to T3 may be an N-type transistor and the rest may be P-type transistors. Moreover, the circuit configuration of a pixel according to one or more aspects of the present disclosure is not limited to FIG. 4 (e.g., various other configurations are possible by analogy, without departing from the scope of the present disclosure). The pixel circuit unit PXC illustrated in FIG. 4 is only one example, and the configuration of the pixel circuit unit PXC may be modified and carried out.

Referring to FIG. 4, the first scan line SCLj may deliver the first scan signal SCj. The second scan line SSLj may deliver the second scan signal SSj. The data line DLi delivers a data signal Di. The data signal Di may have a voltage level corresponding to the input image signal RGB that is input to the display device DD (e.g., as described in more detail herein, for example, with reference to FIG. 1).

In some embodiments, a first driving voltage ELVDD and an initialization voltage VINT is delivered to the pixel circuit unit PXC through the first voltage line VL1 and the third voltage line VL3. A second driving voltage ELVSS may be delivered to a cathode (or a second terminal) of the light emitting element ED through the second voltage line VL2.

The first transistor T1 includes a first electrode connected to the first voltage line VL1, a second electrode electrically connected to an anode (or a first terminal) of the light emitting element ED, and a gate electrode connected to one end of the capacitor Cst. The first transistor T1 may supply a driving current to the light emitting element ED in response to the data signal Di delivered through the data line DLi depending on a switching operation of the second transistor T2.

The second transistor T2 includes a first electrode connected to the data line DLi, a second electrode connected to the gate electrode of the first transistor T1, and a gate electrode connected to the first scan line SCLj. The second transistor T2 may be turned on depending on a first scan signal SCj received through the first scan line SCLj so as to deliver the data signal Di delivered through the data line DLi to the gate electrode of the first transistor T1.

The third transistor T3 includes a first electrode connected to the third voltage line VL3, a second electrode connected to the anode of the light emitting element ED, and a gate electrode connected to the second scan line SSLj. The third transistor T3 may be turned on depending on a second scan signal SSj received through the second scan line SSLj so as to deliver the initialization voltage VINT to the anode of the light emitting element ED.

As described above, one end of the capacitor Cst is connected to the gate electrode of the first transistor T1, and the other end of the capacitor Cst is connected to the second electrode of the first transistor T1. The structure of the pixel PXij is not limited to one or more aspects illustrated in FIG. 4. The number of transistors included in the pixel PXij, the number of capacitors, and the connection relationship may be modified in various manners by analogy, without departing from the scope of the present disclosure.

Figure 5:
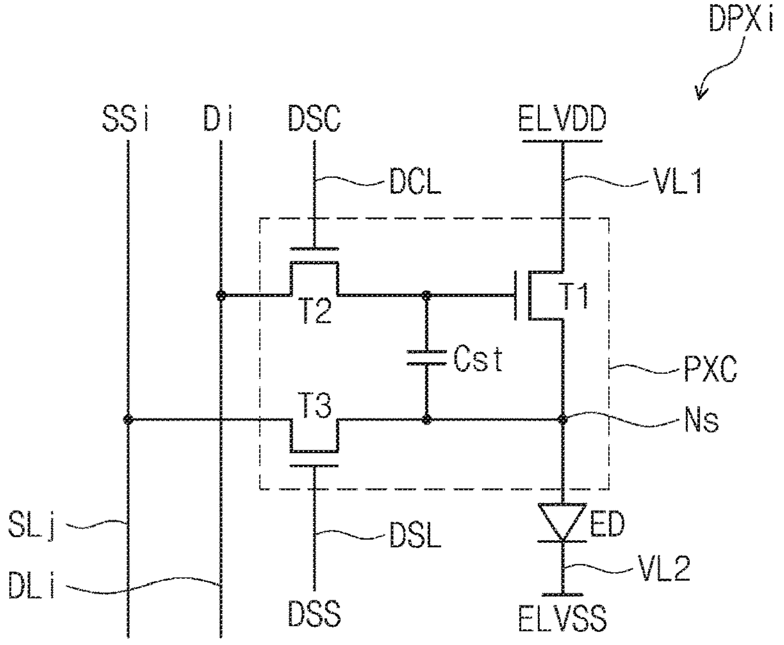
FIG. 5 is a circuit diagram of a dummy pixel, according to one or more aspects of the present disclosure.

FIG. 5 is a circuit diagram of a dummy pixel, according to one or more aspects of the present disclosure.

A dummy pixel DPXi shown in FIG. 5 is an equivalent circuit diagram of the pixel DPXi connected to the i-th the data line DLi among the data lines DL1 to DLm and the dummy scan lines DCL and DSL, which are shown in FIG. 3.

The dummy pixel DPXi shown in FIG. 5 is similar to the pixel PXij shown in FIG. 4, and thus additional descriptions are omitted to avoid redundancy.

In some embodiments, the dummy pixel DPXi is turned on when a dummy scan signal DSS received through the dummy scan line DSL is at a high level so as to deliver a current at an anode (i.e., a sensing node Ns) of the light emitting element ED to the sensing line SLj. A sensing signal SSi output through the sensing line SLj may be provided to the driving controller 100 illustrated in FIG. 3.

In some examples, the dummy pixel DPXi shown in FIG. 5 is similar to the pixel PXij shown in FIG. 4, but the present disclosure is not limited thereto. The dummy pixel DPXi may include a circuit configuration different from that of the pixel PXij.

Figure 6:
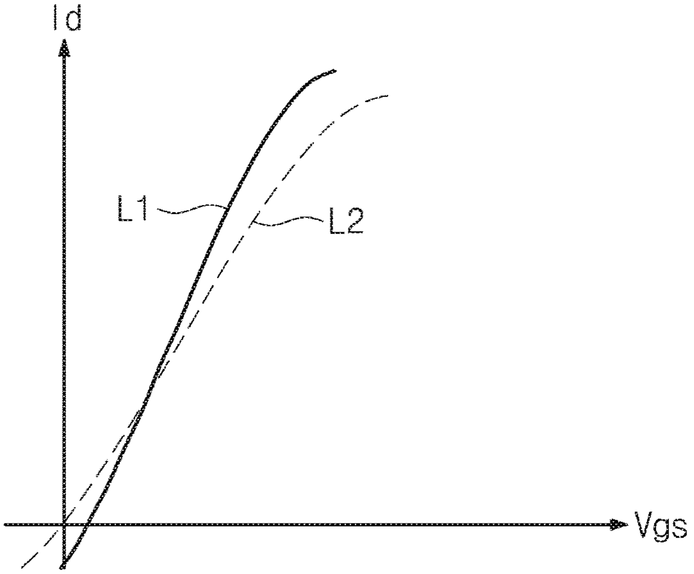
FIG. 6 is a diagram illustrating a voltage-current characteristic of a first transistor of FIG. 4.

FIG. 6 is a diagram illustrating a voltage-current characteristic of a first transistor shown in FIG. 4.

Referring to FIGS. 4 and 6, in the first transistor T1, a current Id flowing from the second electrode to the first electrode may be changed depending on a voltage Vgs between the gate electrode and the first electrode.

At an initial time, a voltage-current characteristic of the first transistor T1 may be a first curve L1. However, when an operating time of the first transistor T1 increases (e.g., when the operating time is not less than 1000 hours), the voltage-current characteristic of the first transistor T1 may be changed to a second curve L2. In detail, when the first transistor T1 is an N-type transistor by using an oxide semiconductor as a semiconductor layer, a change in the voltage-current characteristic of the first transistor T1 may increase.

When the voltage-current characteristic of the first transistor T1 is changed, even though the same data signal Di is delivered to the gate electrode of the first transistor T1, the amount of current flowing through the light emitting element ED may be changed. In this case, the display quality may be deteriorated.

Figure 7:
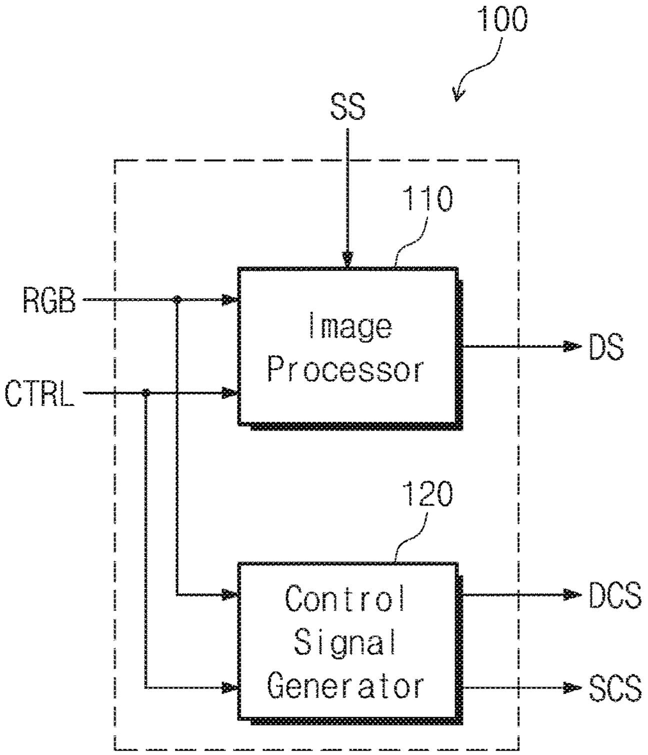
FIG. 7 is a schematic diagram of a driving controller, according to one or more aspects of the present disclosure.

FIG. 7 is a schematic diagram of a driving controller, according to one or more aspects of the present disclosure.

Referring to FIGS. 3 and 7, the driving controller 100 includes an image processor 110 and a control signal generator 120.

The image processor 110 outputs the output image signal DS in response to the input image signal RGB and the control signal CTRL. In some examples, the image processor 110 may change a grayscale level of the output image signal DS in response to the sensing signal SS from the dummy pixels DPX.

In some aspects, image processor 110 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the image processor 110 may be configured to operate a memory array using a memory controller. In other cases, a memory controller is integrated into the image processor 110. In some cases, the image processor 110 is configured to execute computer-readable instructions stored in a memory to perform various functions. In some embodiments, the image processor 110 includes special purpose components for image processing, digital signal processing, etc.

The control signal generator 120 outputs the data control signal DCS and the scan control signal SCS in response to the input image signal RGB and the control signal CTRL.

Figure 8:
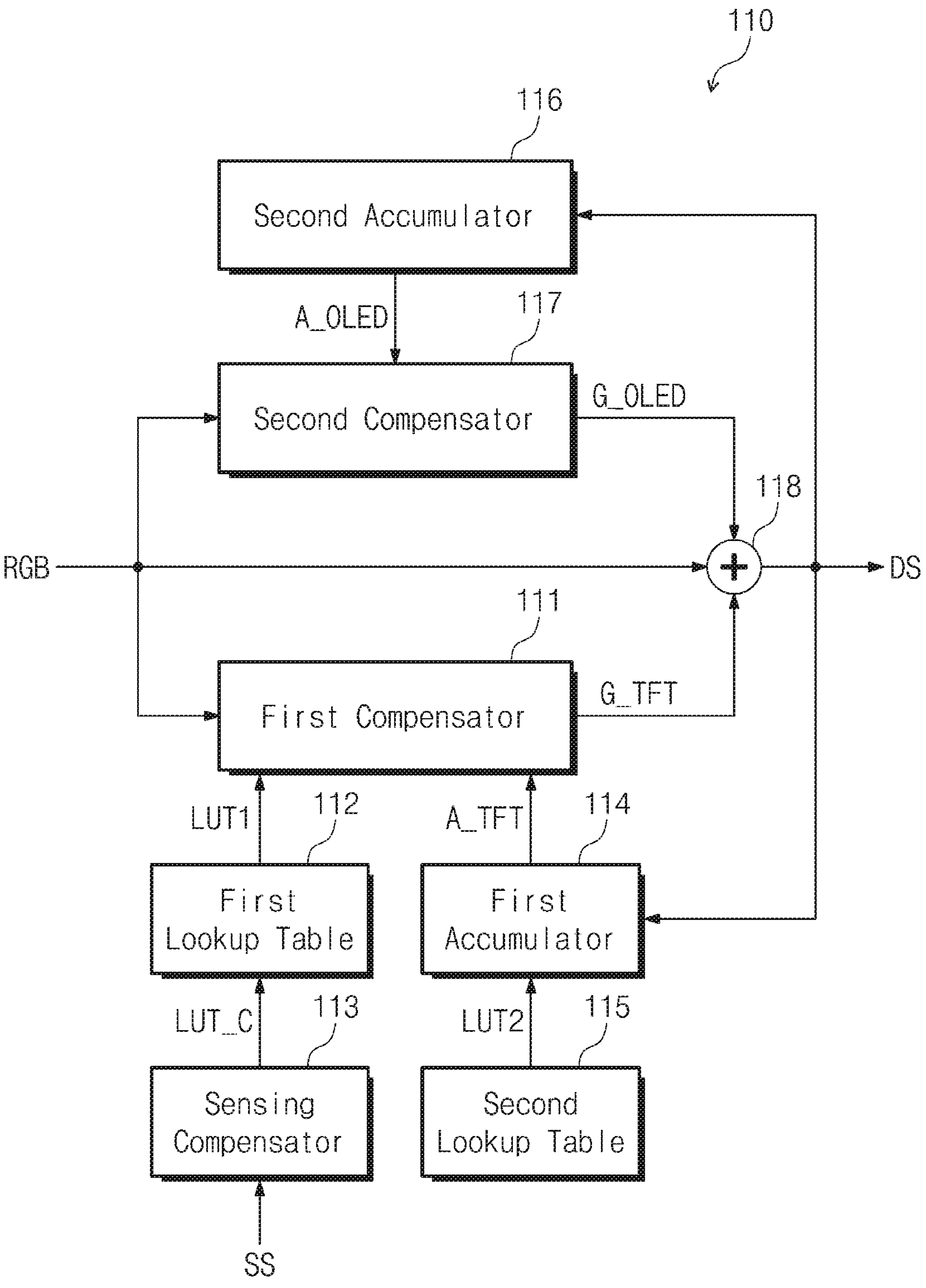
FIG. 8 is a schematic diagram illustrating a configuration of an image processor in a driving controller, according to one or more aspects of the present disclosure.

FIG. 8 is a schematic diagram illustrating an example configuration of an image processor in a driving controller, according to one or more aspects of the present disclosure.

Referring to FIGS. 3 and 8, the image processor 110 includes a first compensator 111, a first lookup table 112, a sensing compensator 113, a first accumulator 114, a second lookup table 115, a second accumulator 116, a second compensator 117, and an adder 118.

In some examples, the first compensator 111, the first lookup table 112, the sensing compensator 113, the first accumulator 114, and the second lookup table 115 are included in a first compensation block for compensating for a characteristic change of a transistor (e.g., the first transistor T1 shown in FIG. 4) in the pixel PX.

The first lookup table 112 stores a compensation value corresponding to an operating time of the pixel PX. Generally, a compensation value may include a time value (e.g., a value indicating the operating time of a pixel/dummy pixel), a current value (e.g., a value corresponding to a current compensation for a pixel/dummy pixel), a grayscale value (e.g., a value corresponding to a grayscale compensation for a pixel/dummy pixel), etc.

In some examples, a lookup table may include, or refer to, an organized collection of data (e.g., compensation values). For example, a lookup table may store data (e.g., compensation values) in a specified format or schema. In some cases, a lookup table may include, or refer to, certain memory in a device, a database, etc.

The first accumulator 114 accumulates the output image signal DS and outputs a first accumulation signal A_TFT. The first accumulation signal A_TFT may correspond to a stress level of a transistor in the pixel PX according to the operating time and the grayscale level of the pixel PX.

The first compensator 111 outputs a first compensation signal G_TFT corresponding to the input image signal RGB and the first accumulation signal A_TFT from the first accumulator 114 with reference to a compensation value LUT1 of the first lookup table 112.

The sensing compensator 113 outputs a correction value LUT_C for correcting the compensation value of the first lookup table 112 based on the sensing signal SS from the dummy pixel DPX.

The second lookup table 115 stores a correction value according to a location of the pixel PX in the display panel (e.g., in other words, a location in the display panel DP corresponding to the pixel PX). The first accumulator 114 may output the first accumulation signal A_TFT corresponding to the output image signal DS with reference to a correction value LUT2 stored in the second lookup table 115.

In some embodiments, the second accumulator 116 and the second compensator 117 are included in a second compensation block for compensating for a characteristic change of a light emitting element (e.g., the light emitting element ED shown in FIG. 4) in the pixel PX.

The second accumulator 116 accumulates the output image signal DS and outputs a second accumulation signal A_OLED. The second accumulation signal A_OLED may correspond to a stress level of a light emitting element in the pixel PX according to an operating time and a grayscale level of the pixel PX.

The second compensator 117 outputs a second compensation signal G_OLED corresponding to the input image signal RGB and the second accumulation signal A_OLED from the second accumulator 116.

The adder 118 outputs the output image signal DS by adding the input image signal RGB, the first compensation signal G_TFT and the second compensation signal G_OLED.

In some examples, the adder 118 may output the output image signal DS by adding only the input image signal RGB and the first compensation signal G_TFT. In some examples, the adder 118 may output the output image signal DS by adding only the input image signal RGB and the second compensation signal G_OLED.

Figure 9:
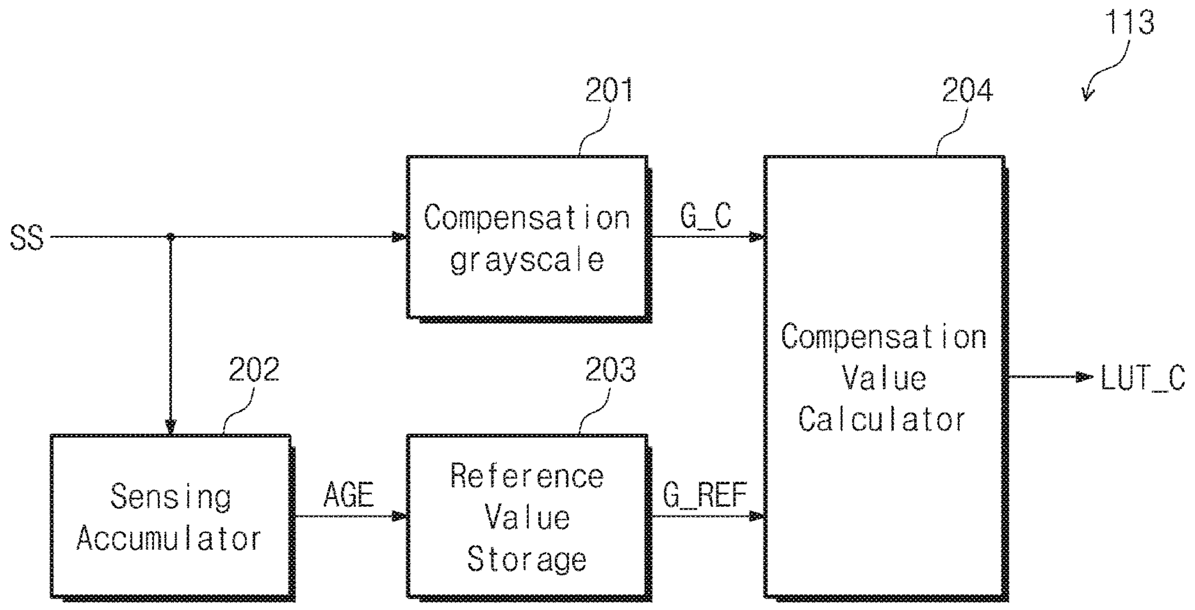
FIG. 9 is a schematic diagram illustrating a configuration of a sensing compensator, according to one or more aspects of the present disclosure.

FIG. 9 is a schematic diagram illustrating a configuration of the sensing compensator 113, according to one or more aspects of the present disclosure.

Referring to FIG. 9, the sensing compensator 113 includes a compensation grayscale calculator 201, a sensing accumulator 202, a reference value storage 203, and a compensation value calculator 204.

Figure 10:
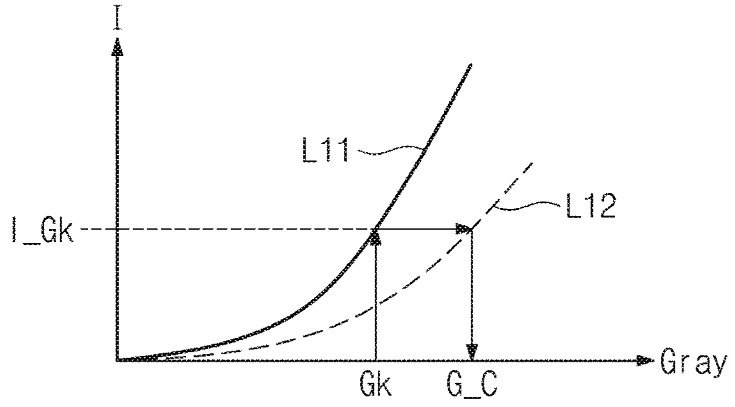
FIG. 10 is a diagram for describing an operation of a compensation grayscale calculator of FIG. 9.

FIG. 10 is a diagram for describing an operation of the compensation grayscale calculator 201 shown in FIG. 9.

FIG. 10 shows a relationship between a current at the sensing node Ns and a grayscale level of the data signal Di provided to the gate electrode of the first transistor T1 in the pixel PXij shown in FIG. 4.

Referring to FIGS. 4, 9, and 10, a grayscale level-current characteristic of the first transistor T1 may be a first curve L11. However, when an operating time of the first transistor T1 increases (e.g., when the operating time is not less than 1000 hours), the grayscale level-current characteristic of the first transistor T1 may be changed to a second curve L12.

The compensation grayscale calculator 201 compares a current according to the grayscale level-current characteristic of the first transistor T1 corresponding to the first curve L11 stored in a memory (not shown) with a current level of the sensing signal SS received from the dummy pixel DPX. For example, when the grayscale level of the data signal Di initially provided to the gate electrode of the first transistor T1 is Gk, a current at the sensing node Ns may be I_Gk. At this time, when the current level of the sensing signal SS is not I_Gk, the compensation grayscale calculator 201 searches for a compensation grayscale G_C corresponding to the current I_Gk.

In some examples, the driving controller 100 may sequentially provide the dummy pixel DPX with the data signal Di corresponding to all grayscale levels (e.g., grayscale level 0 to grayscale level 255), may receive the sensing signal SS, and may obtain information about the second curve L12.

In some examples, the driving controller 100 may sequentially provide the dummy pixel DPX with the data signal Di corresponding to representative grayscale levels that are some of all grayscale levels, may receive the sensing signal SS, and may obtain information about the second curve L12. A current for a grayscale level other than a representative grayscale levels may be obtained through interpolation calculations.

The compensation grayscale calculator 201 calculates the compensation grayscale G_C for the grayscale level Gk by using the first curve L11 and the second curve L12.

Returning to FIG. 9, the sensing accumulator 202 may count the operating time of the dummy pixel DPX by accumulating the sensing signal SS. The sensing accumulator 202 outputs operating time information AGE corresponding to the operating time of the dummy pixel DPX. The operating time information AGE may be stored in a memory (not shown).

Examples of memory or storage may include random access memory (RAM), read-only memory (ROM), or a hard disk. Examples of memory devices or storage devices include solid state memory and a hard disk drive. In some examples, memory or storage is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some cases, software may include code to implement one or more aspects of the present disclosure. Software may be stored in a non-transitory computer-readable medium such as system memory or other memory. In some cases, the software may not be directly executable by the processor but may cause a computer (e.g., when compiled and executed) to perform functions described herein.

The reference value storage 203 outputs a compensation reference value G_REF corresponding to the operating time information AGE. The compensation reference value G_REF is a value predicted in advance depending on the operating time of the dummy pixel DPX.

The compensation value calculator 204 calculates a difference value between the compensation grayscale G_C and the compensation reference value G_REF and outputs a correction value LUT_C corresponding to the difference value.

Figure 11:
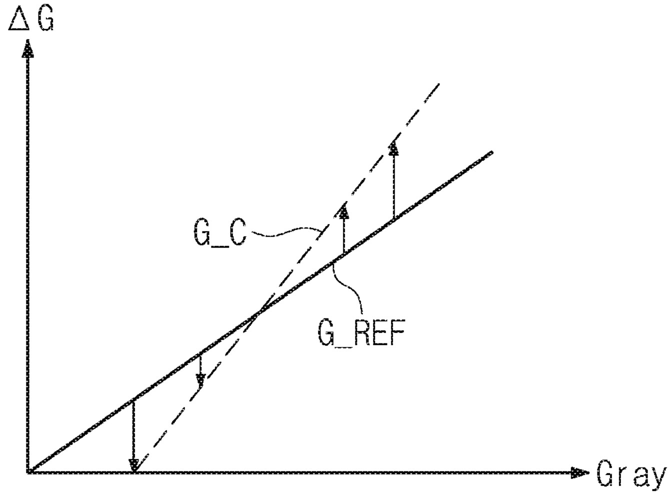
FIG. 11 is a diagram for describing an operation of the compensation value calculator shown in FIG. 9.

FIG. 11 is a diagram for describing an operation of the compensation value calculator shown in FIG. 9.

Referring to FIGS. 9 and 11, the reference value storage 203 outputs the compensation reference value G_REF predicted in advance depending on the operating time information AGE of the dummy pixel DPX.

In some embodiments, the compensation grayscale G_C calculated by using the sensing signal SS is different from the compensation reference value G_REF predicted in advance.

The compensation value calculator 204 outputs the correction value LUT_C corresponding to a difference AG between the compensation grayscale G_C and the compensation reference value G_REF.

In some embodiments, the correction value LUT_C from the compensation value calculator 204 is stored in the first lookup table 112 illustrated in FIG. 8.

The first lookup table 112 stores a compensation value corresponding to an operating time of the pixel PX. However, because the compensation value stored in the first lookup table 112 is a predicted value, a compensation value required for an actual characteristic change according to the operating time of the first transistor Ti in the pixel PX may be different from the compensation value stored in the first lookup table 112.

The sensing compensator 113 calculates the correction value LUT_C based on the sensing signal SS received from the dummy pixel DPX and corrects the compensation value stored in the first lookup table 112.

FIG. 12 shows the first lookup table 112.

The first lookup table 112 shown in FIG. 12 stores a compensation value corresponding to the input image signal RGB and the first accumulation signal A_TFT.

FIG. 12 illustrates the compensation values corresponding to the input image signal RGB such as 0, 128, 256, 384, 512, 640, 768, 896, . . . , 8064 and the first accumulation signal A_TFT such as 0, 16, 32, 64, 128, . . . , 1024. However, the present disclosure is not limited thereto. A range of each of the input image signal RGB and the first accumulation signal A_TFT may be variously changed. In particular, the first accumulation signal A_TFT is obtained by converting a value from accumulating the operating time and grayscale level of the first transistor T1 into a value between 0 and 1024.

Referring to FIGS. 8 and 12, the first compensator 111 may output the first compensation signal G_TFT corresponding to the input image signal RGB and the first accumulation signal A_TFT from the first accumulator 114 with reference to the first lookup table 112. For example, the first compensation signal G_TFT may correspond to (e.g., be generated based on) the input image signal RGB and the first accumulation signal A_TFT, while taking into account a compensation value stored in the first lookup table 112. For instance, the first compensation signal G_TFT may be generated based on the input image signal RGB and the first accumulation signal A_TFT, where the generated signal may be adjusted based on a compensation value stored in the first lookup table 112 prior to being output by the first compensator 111 as the first compensation signal G_TFT.

For example, when the input image signal RGB is 256 and the first accumulation signal A_TFT from the first accumulator 114 is 64, the first compensator 111 reads out 339 of the first lookup table 112 as the compensation value LUT1.

When the input image signal RGB is 256 and the first accumulation signal A_TFT from the first accumulator 114 is 64, the compensation value of 339 may be a value predicted in advance.

In some embodiments, the compensation value stored in the first lookup table 112 is updated by the sensing compensator 113. The compensation value of the first lookup table 112 may be corrected by reflecting the deterioration characteristics of the dummy pixel DPX similar to the actual deterioration characteristics of the pixel PX, thereby improving the degradation compensation characteristic of the image processor 110.

Figure 13:
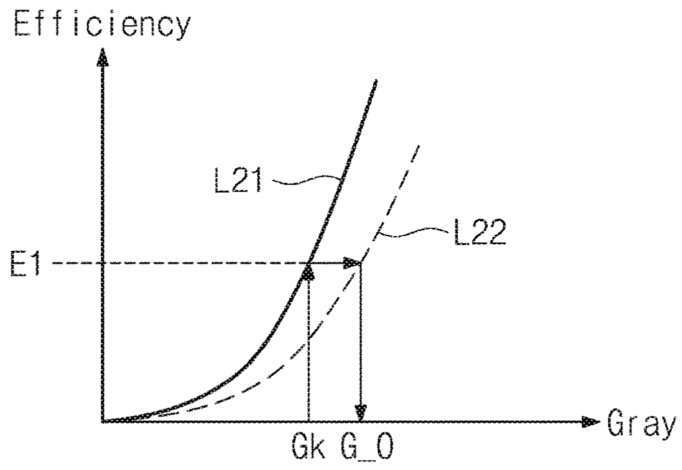
FIG. 13 is a diagram for describing an operation of a second compensator of FIG. 8.

FIG. 13 is a diagram for describing an operation of the second compensator 117 shown in FIG. 8.

Referring to FIGS. 8 and 13, the second compensator 117 outputs a second compensation signal G_OLED corresponding to the input image signal RGB and the second accumulation signal A_OLED from the second accumulator 116.

At an initial time, the grayscale level-emission efficiency characteristic of the light emitting element ED shown in FIG. 4 may be a first curve L21. however, when the operating time of the light emitting element ED increases (e.g., when the operating time is not less than 1000 hours), the grayscale level-emission efficiency characteristic of the light emitting element ED may be changed to a second curve L22.

The second compensator 117 calculates an initial efficiency E1 corresponding to the grayscale level Gk of the input image signal RGB and calculates a compensation grayscale level G_O corresponding to the initial efficiency E1. The second compensator 117 outputs the second compensation signal G_OLED corresponding to a difference between the grayscale level Gk of the input image signal RGB and the compensation grayscale level G_O.

Figure 14:
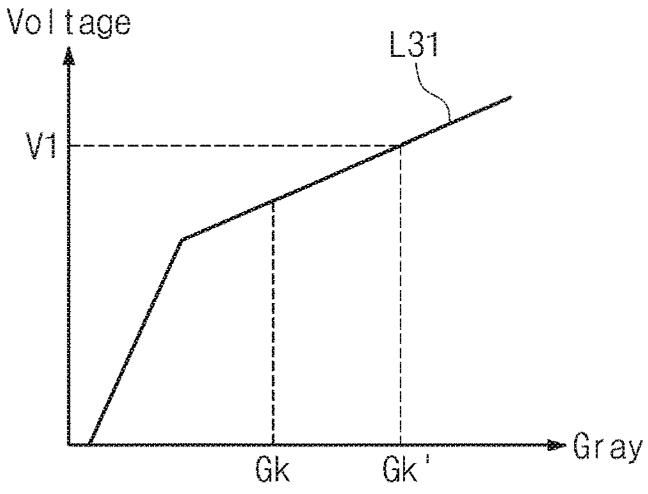
FIG. 14 is a diagram for describing an operation of a first accumulator 114 shown in FIG. 8.

FIG. 14 is a diagram for describing an operation of the first accumulator 114 shown in FIG. 8.

Referring to FIGS. 8 and 14, the first accumulator 114 may output the first accumulation signal A_TFT corresponding to the output image signal DS with reference to the correction value LUT2 stored in the second lookup table 115.

The second lookup table 115 may store a correction value according to the grayscale level-voltage characteristic of the pixel PX. The curve L31 shown in FIG. 14 is an example of the grayscale level-voltage characteristic of the pixel PX.

When the output image signal DS is gray scale level Gk, the first accumulator 114 may read out the grayscale level Gk' corresponding to voltage V1 as the correction value LUT2.

The pixels PX shown in FIG. 3 may have different stress levels (or the degree of deterioration) depending on locations in the display panel DP. The first accumulator 114 may receive the grayscale level Gk', to which a stress level is reflected and which is obtained by converting the grayscale level Gk of the output image signal DS, depending on a location of the pixel PX to which the output image signal DS will be provided. Accordingly, the image correction performance of the image processor 110 may be improved.

Figure 15:
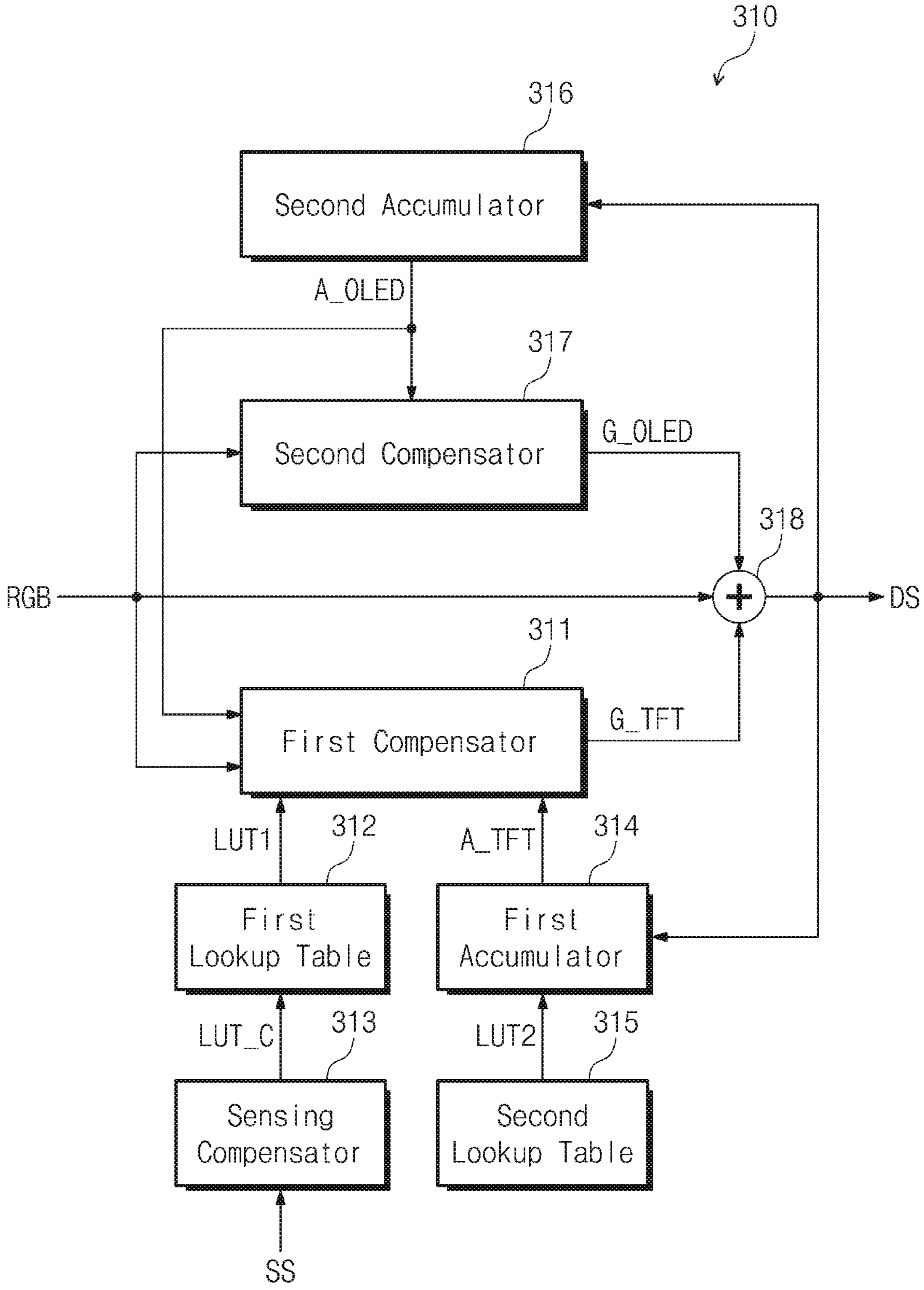
FIG. 15 is a schematic diagram illustrating a configuration of an image processor in a driving controller, according to one or more aspects of the present disclosure.

FIG. 15 is a schematic diagram illustrating a configuration of an image processor in a driving controller, according to one or more aspects of the present disclosure.

Referring to FIG. 15, an image processor 310 includes a first compensator 311, a first lookup table 312, a sensing compensator 313, a first accumulator 314, a second lookup table 315, a second accumulator 316, a second compensator 317, and an adder 318.

In some embodiments, the first compensator 311, the first lookup table 312, the sensing compensator 313, the first accumulator 314, and the second lookup table 315 are included in a first compensation block for compensating for a characteristic change of a transistor (e.g., the first transistor T1 shown in FIG. 4) in the pixel PX.

In some embodiments, the second accumulator 316 and the second compensator 317 are included in a second compensation block for compensating for a characteristic change of a light emitting element (e.g., the light emitting element ED shown in FIG. 4) in the pixel PX.

Among the components in the image processor 310 illustrated in FIG. 15, descriptions of components similar to those in the image processor 310 illustrated in FIG. 8 will be omitted to avoid redundancy.

The first compensator 311 receives the second accumulation signal A_OLED from the second accumulator 316.

The first compensator 311 may output the first compensation signal G_TFT corresponding to the input image signal RGB, the first accumulation signal A_TFT from the first accumulator 314, and the second accumulation signal A_OLED from the second accumulator 316 with reference to the first lookup table 312.

Figure 16:
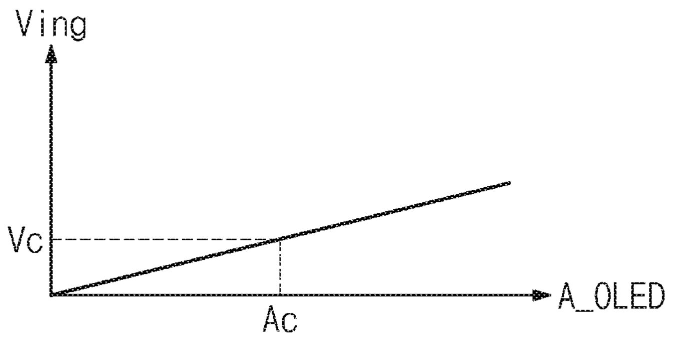
FIG. 16 illustrates a voltage correction coefficient according to a second accumulation signal.

FIG. 16 illustrates a voltage correction coefficient Ving according to the second accumulation signal A_OLED.

Referring to FIGS. 15 and 16, the first compensator 311 calculates a voltage correction coefficient Ving according to the second accumulation signal A_OLED. A voltage correction coefficient Ving according to the second accumulation signal A_OLED may be a preset value.

For example, when the second accumulation signal A_OLED is Ac, the voltage correction coefficient Ving may be Vc. In an example shown in FIG. 16, as the second accumulation signal A_OLED increases (i.e., as the operating time of the light emitting element ED increases), the voltage correction coefficient Ving increases.

Figure 17:
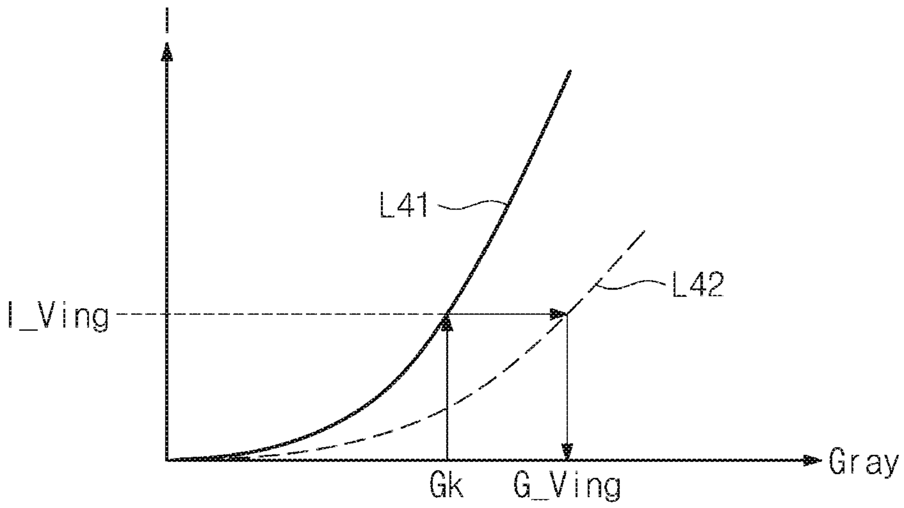
FIG. 17 illustrates a grayscale level-current conversion characteristic of an input image signal of a first compensator according to a voltage correction coefficient.

FIG. 17 illustrates a grayscale level-current conversion characteristic of the input image signal RGB of the first compensator 311 according to the voltage correction coefficient Ving.

When the voltage correction coefficient Ving is a first value, a first curve L41 shown in FIG. 17 indicates a grayscale level-current conversion characteristic of the input image signal RGB of the first compensator 311. A second curve L42 indicates a grayscale level-current conversion characteristic of the input image signal RGB of the first compensator 311 when the voltage correction coefficient Ving has a second value. In some examples, the first value of the voltage correction coefficient Ving may be 0; and the second value of the voltage correction coefficient Ving may be 0.2.

Referring to FIGS. 15, 16, and 17, when the voltage correction coefficient Ving is the first value and the grayscale level of the input image signal RGB is Gk, the first compensator 311 may output the first compensation signal G_TFT such that a current T provided to the light emitting element ED becomes I_Ving.

In some embodiments, the first compensator 311 outputs the first compensation signal G_TFT by reading out the compensation value LUT1 corresponding to the grayscale level of the input image signal RGB from the first lookup table 312.

When the voltage correction coefficient Ving is the second value and the grayscale level of the input image signal RGB is Gk, the first compensator 311 may convert the grayscale level of the input image signal RGB to G_Ving such that the current (I) provided to the light emitting element ED becomes I_Ving, and may output the first compensation signal G_TFT corresponding to the grayscale level G_Ving.

In other words, the first compensator 311 may output the first compensation signal G_TFT by reading out the compensation value LUT1 corresponding to the grayscale level G_Ving from the first lookup table 312.

The first curve L41 and the second curve L42 are shown in FIG. 17. However, there may be various grayscale level-current conversion characteristics of the input image signal RGB depending on the value of the voltage correction coefficient Ving.

Although described above with reference to various examples, it will be understood by those skilled in the art that various modifications and changes may be made in the present disclosure without departing from the spirit and scope of the present disclosure as set forth in the claims below. Furthermore, embodiments of the present disclosure are not intended to limit the technical spirit of the present disclosure. All technical spirits within the scope of the following claims and all equivalents thereof should be construed as being included within the scope of the present disclosure.

A display device having such a configuration may compensate for a change in characteristics of a light emitting element and a transistor in a pixel.

In detail, a driving circuit may update a lookup table that stores a compensation value corresponding to a characteristic change of a transistor depending on a sensing signal received from a dummy pixel. Accordingly, a compensation signal may be generated depending on an actual characteristic change of the transistor in the pixel.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A display device comprising:

a display panel comprising a pixel positioned in an active area and a dummy pixel positioned in an inactive area adjacent to the active area;

a driving controller configured to output an output image signal to a data driving circuit based on a sensing signal received from the dummy pixel; and the data driving circuit configured to provide the pixel and the dummy pixel with a data signal corresponding to the output image signal via a same data line, wherein the driving controller comprises:

a first accumulator configured to accumulate the output image signal and to output a first accumulation signal;

a first lookup table configured to store a compensation value, the compensation value corresponding to a grayscale level of an input image signal and an operating time of the pixel;

a sensing compensator configured to correct the compensation value stored in the first lookup table based on the sensing signal received from the dummy pixel;

a first compensator configured to output a first compensation signal based on the input image signal, the first accumulation signal, and the compensation value stored in the first lookup table; and an adder configured to output the output image signal by adding the first compensation signal to the input image signal, wherein the sensing compensator comprises:

a compensation grayscale calculator configured to calculate a compensation grayscale corresponding to the sensing signal;

a sensing accumulator configured to accumulate the sensing signal and to output operating time information corresponding to an operating time of the dummy pixel;

a reference value storage configured to store predicted compensation reference values corresponding to an operating time of the dummy pixel and output a compensation reference value corresponding to the operating time information; and a compensation value calculator configured to calculate a difference value between the compensation grayscale and the compensation reference value and to output a correction value for correcting the compensation value stored in the first lookup table, wherein the correction value corresponds to the calculated difference value, and wherein the compensation reference value is one of the predicted compensation reference values.

2. The display device of claim 1, wherein the pixel includes:

a first transistor electrically connected between a first voltage line and a first node, wherein the first transistor comprises a gate electrode configured to receive the data signal from the data driving circuit; and a light emitting element electrically connected between the first node and a second voltage line.

3. The display device of claim 2, wherein the first compensation signal comprises a signal for compensating for a current at the first node according to a characteristic change of the first transistor.

4. The display device of claim 2, wherein the driving controller further includes:

a second accumulator configured to accumulate the output image signal and output a second accumulation signal; and a second compensator configured to output a second compensation signal corresponding to the input image signal and the second accumulation signal, wherein the adder is configured to output the output image signal by adding the first compensation signal and the second compensation signal to the input image signal.

5. The display device of claim 4, wherein the second compensation signal comprises a signal for compensating for a characteristic change of the light emitting element.

6. The display device of claim 4, wherein the first compensator receives the second accumulation signal from the second compensator, calculates a voltage correction coefficient based on the second accumulation signal, changes the grayscale level of the input image signal into a grayscale level corresponding to the voltage correction coefficient, and outputs the first compensation signal corresponding to the changed grayscale level and the first accumulation signal based on the compensation value from the first lookup table.

7. The display device of claim 6, wherein the voltage correction coefficient is proportional to the operating time of the pixel.

8. The display device of claim 1, wherein the dummy pixel includes:

a first transistor electrically connected between a first voltage line and a first node, wherein the first transistor comprises a gate electrode configured to receive the data signal; and a light emitting element electrically connected between the first node and a second voltage line.

9. The display device of claim 8, wherein the sensing signal corresponds to a current at the first node.

10. The display device of claim 1, wherein the driving controller further includes:

a second lookup table configured to store a correction value according to a location of the pixel in the display panel, wherein the first accumulator outputs the first accumulation signal corresponding to the output image signal based on referencing the correction value stored in the second lookup table.

11. A display device comprising:

a display panel comprising a pixel positioned in an active area and a dummy pixel positioned in an inactive area adjacent to the active area;

a driving controller configured to output an output image signal based on an input image signal and a sensing signal, wherein the sensing signal is received from the dummy pixel; and a data driving circuit configured to provide the pixel and the dummy pixel with a data signal corresponding to the output image signal, wherein the pixel includes a light emitting element and a transistor electrically connected to the light emitting element, wherein the driving controller comprises:

a first compensation block configured to output: a first compensation signal for compensating for a characteristic change of the transistor based on the input image signal, a first accumulation signal from accumulating the output image signal, and the sensing signal from the dummy pixel, wherein the first accumulation signal indicates a stress level of the transistor;

a second compensation block configured to output a second compensation signal for compensating for a characteristic change of the light emitting element based on the input image signal and a second accumulation signal from accumulating the output image signal, wherein the second accumulation signal indicates a stress level of the light emitting element; and an adder configured to output the output image signal by adding the input image signal, the first compensation signal, and the second compensation signal, wherein the first compensation block includes:

a first lookup table configured to store a compensation value, the compensation value corresponding to a grayscale level of the input image signal and an operating time of the pixel; and a sensing compensator configured to correct the compensation value stored in the first lookup table based on the sensing signal from the dummy pixel, wherein the sensing compensator includes:

a compensation grayscale calculator configured to calculate a compensation grayscale corresponding to the sensing signal;

a sensing accumulator configured to accumulate the sensing signal and output operating time information corresponding to an operating time of the dummy pixel;

a reference value storage configured to store predicted compensation reference values corresponding to an operating time of the dummy pixel and output a compensation reference value corresponding to the operating time information; and a compensation value calculator configured to:

calculate a difference value between the compensation grayscale and the compensation reference value, and output a correction value for correcting the compensation value stored in the first lookup table, wherein the correction value corresponds to the difference value, and wherein the compensation reference value is one of the predicted compensation reference values.

12. The display device of claim 11, wherein the first compensation block includes:

a first accumulator configured to accumulate the output image signal and output the first accumulation signal; and a first compensator configured to output the first compensation signal, the first compensation signal corresponding to the input image signal and the first accumulation signal based on the compensation value stored in the first lookup table.

13. The display device of claim 12, wherein the second compensation block includes:

a second accumulator configured to accumulate the output image signal and output the second accumulation signal; and a second compensator configured to output the second compensation signal corresponding to the input image signal and the second accumulation signal.

14. The display device of claim 13, wherein the first compensator receives the second accumulation signal from the second compensator, calculates a voltage correction coefficient according to the second accumulation signal, changes a grayscale level of the input image signal into a grayscale level corresponding to the voltage correction coefficient, and outputs the first compensation signal corresponding to the changed grayscale level and the first accumulation signal based on referencing the compensation value from the first lookup table.

15. The display device of claim 14, wherein the voltage correction coefficient is proportional to the operating time of the pixel.

16. The display device of claim 11, wherein the dummy pixel includes:

a first transistor electrically connected between a first voltage line and a first node, wherein the first transistor includes a gate electrode configured to receive the data signal; and a light emitting element electrically connected between the first node and a second voltage line.

17. The display device of claim 16, wherein the sensing signal corresponds to a current at the first node.

18. The display device of claim 11, wherein the driving controller further includes:

a second lookup table configured to store a correction value according to a location of the pixel in the display panel, and wherein the first accumulator outputs the first accumulation signal corresponding to the output image signal based on referencing the correction value stored in the second lookup table.

* * * * *